United States Patent
Le et al.

(10) Patent No.: US 7,668,145 B2
(45) Date of Patent: Feb. 23, 2010

(54) METHOD TO SUPPORT MOBILE IP MOBILITY IN 3GPP NETWORKS WITH SIP ESTABLISHED COMMUNICATIONS

(75) Inventors: Franck Le, Irving, TX (US); Stefano Faccin, Dallas, TX (US); Rene Purnadi, Coppell, TX (US); Sandro Grech, Helsinki (FI)

(73) Assignee: Nokia Corporation, Espoo (FI)

( * ) Notice: Subject to any disclaimer, the term of this patent is extended or adjusted under 35 U.S.C. 154(b) by 1020 days.

(21) Appl. No.: 10/859,556

(22) Filed: Jun. 3, 2004

(65) Prior Publication Data

US 2005/0165917 A1    Jul. 28, 2005

Related U.S. Application Data

(60) Provisional application No. 60/530,982, filed on Dec. 22, 2003.

(51) Int. Cl.
*H04W 4/00* (2009.01)
*G06F 11/00* (2006.01)

(52) U.S. Cl. .................... 370/338; 370/401; 726/22

(58) Field of Classification Search ............. 370/338, 370/328, 329, 331, 401; 726/22
See application file for complete search history.

(56) References Cited

U.S. PATENT DOCUMENTS

| 6,621,810 | B1 * | 9/2003 | Leung | 370/338 |
| 6,915,325 | B1 * | 7/2005 | Lee et al. | 709/202 |
| 7,328,281 | B2 * | 2/2008 | Takeda et al. | 709/246 |
| 7,349,377 | B2 * | 3/2008 | Le et al. | 370/338 |
| 7,372,840 | B2 * | 5/2008 | Le et al. | 370/338 |
| 7,453,850 | B2 * | 11/2008 | Yang et al. | 370/331 |

(Continued)

FOREIGN PATENT DOCUMENTS

EP    1 317 112 A2    6/2003

OTHER PUBLICATIONS

3GPP TS 29.207 v5.4.0 (Jun. 2003); "*3rd Generation Partnership Project; Technical Specification Group Core Network; Policy Control Over Go Interface (Release 5)*", pp. 1-55.

(Continued)

*Primary Examiner*—Kevin C Harper
*Assistant Examiner*—Xavier Wong
(74) *Attorney, Agent, or Firm*—Mintz, Levin, Cohn, Ferris, Glovsky and Popeo, P.C.

(57) ABSTRACT

The invention proposes a method for controlling a connection between a first network node and a second network node, wherein the connection is controlled by a packet filtering function filtering packets such that a packet is discarded in case a source address and/or a destination address do not comply with a filtering rule, wherein the packet filtering function is configured at a connection set up, and at least one of the first or second network node is adapted to change its address, the method comprising the steps of informing, the packet filtering function about the new address of the network node having changed its address, and updating the packet filter of the packet filtering function by using the new address of the network node having changed its address. The invention also proposes a corresponding network system comprising at least a network node and a packet filtering network element. Furthermore, the invention proposes a corresponding packet filtering network device.

31 Claims, 7 Drawing Sheets

U.S. PATENT DOCUMENTS

| | | | |
|---|---|---|---|
| 2002/0009066 A1* | 1/2002 | Shimizu et al. | 370/338 |
| 2003/0026230 A1* | 2/2003 | Ibanez et al. | 370/338 |
| 2003/0069016 A1 | 4/2003 | Bahl et al. | |
| 2003/0117988 A1* | 6/2003 | Asano et al. | 370/338 |
| 2003/0193912 A1* | 10/2003 | O'Neill | 370/331 |
| 2004/0004967 A1* | 1/2004 | Nakatsugawa et al. | 370/400 |
| 2004/0100951 A1* | 5/2004 | O'neill | 370/389 |
| 2004/0151135 A1* | 8/2004 | Kitahama et al. | 370/328 |
| 2004/0151148 A1* | 8/2004 | Yahagi | 370/338 |

OTHER PUBLICATIONS

Schmidt, S. et al., "*An Access Control Architecture for Microcellular Wireless IPv6 Networks*", Nov. 14, 2001, pp. 454-463.

Chen, Xiaobao et al., "*MIPv6 Inter-Working with Packet Filtering*", Jun. 17, 2003, pp. 1-16.

International Search Report PCT/IB2004/004256 filed Dec. 15, 2004.

* cited by examiner

METHOD TO SUPPORT MOBILE IP MOBILITY IN 3GPP NETWORKS WITH SIP ESTABLISHED COMMUNICATIONS

REFERENCE TO RELATED APPLICATIONS

This application claims priority of U.S. provisional Patent Application Ser. No. 60/530,982, filed on Dec. 22, 2003, the contents of which are hereby incorporated by reference.

BACKGROUND OF THE INVENTION

1. Field of the Invention

The invention relates to a method and a network system for controlling a connection of a network node.

2. Description of the Related Art

This invention is related to mobility management, and more particularly to the support of Mobile IPv6 (Internet Protocol version 6) for SIP (Session Initiation Protocol) communications in 3GPP (Third Generation Partnership Project) networks. It actually addresses some issues that occur when a SIP communication is established via the 3GPP IMS (Internet Multimedia Subsystem), between a 3GPP node and a Mobile IP node. This invention is however not restricted to UMTS but applies to all SIP calls set up using IMS where a relation between the IP address used at the access stratum and the IP address at the SIP level needs to be established for QoS (Quality of Service) authorization purposes.

The SIP protocol supports user mobility (i.e. users changing their point of attachment and therefore getting a new IP address) by means of re-registration and/or re-INVITE and by providing the new IP address in the SDP SIP body part. SIP thus has a built-in support for mobility, but there are several reasons why Mobile IP mobility can be preferred to SIP mobility by the user:

For example, SIP Mobility would not allow a service continuity for streams over TCP. In fact, since the IP address is changed, the TCP session needs to be closed down and a new one established (this takes some time and implies delay). In addition, handling the mobility at the SIP level is application specific and therefore several mobility procedures may need to occur (e.g. considering a UDP stream protected by IPsec (Internet Protocol Security), after the SIP mobility procedure is executed to update the other party with the new IP address; the IPsec SA (Security Association) needs also to be updated with the new IP address: this requires additional messages and implies delay in the procedure) whereas Mobile IP handles mobility transparently to all applications and only one procedure is required.

The following describes the interaction issues between Mobile IP and the 3GPP IMS. When a 3GPP UE establishes a communication via the 3GPP IMS, as described in 3GPP TS 29.207, the GGSN (Gateway GPRS Support Node) verifies with the PDF (Policy Decision Function) (through the Go interface) that the requested communication is valid.

If the request is valid, (i.e. the communication is authorized), as part of this procedure, the PDF also installs some packets filters in the GGSN.

The packet classifier parameters are:
The Source IP address;
The Destination IP address;
The Source ports;
The Destination ports;
And the Protocol ID.

These parameters are set by the PDF based from the information in the SDP fields of the SIP signaling, between the 3GPP node and the P-CSCF server. Uplink and downlink packets not matching the packet filters are dropped.

Considering Mobile IP, the following issues arise:

In the following, a scenario illustrated in FIG. 1 is considered where Node B is a Mobile IP node and first has a Care of address (CoA1). A Care-of Address is a unicast routable address associated with a mobile node while visiting a foreign link. This address may change, in contrast to the Home Address (HoA) of the mobile node which is fixed.

The GGSN is connected to a SIP server of an IMS (IP Multimedia Subsystem) over the Go interface. Furthermore, a connection to a node A, which is a 3GPP node, is established via a SGSN (Serving GPRS Support Node) and a radio path via a Base Station and the like, which is not shown in detail.

According to the procedure specified in 3GPP TS 29.207,
the source IP address of the downlink-direction (from the GGSN to node A) packet filters will be set to CoA1
the destination IP address of the uplink-direction (from node A to GGSN) packet filters will be set to CoA1

It is now assumed that Node B changes its IP address to CoA2 and sends a Binding Update message to inform Node A (as specified, for example, in "Mobility Support in IPv6", Internet draft by Johnson, Perkins, Arkko of June 2003, http://www.ietf.org/internet-drafts /draft-ietf-mobileip-ipv6-24.txt):

Packets sent from Node A to Node B will then have the destination IP address field set to the CoA2
Packets sent from Node B to Node A will have the source IP address field set to CoA2
Neither uplink nor downlink packets will therefore match the packet filters and will typically be dropped at the GGSN.

It has to be noted that many other problems exist when a Mobile IP node is communicating with a 3GPP node: e.g. the so-called Return Routability (RR) test specified in the Mobile IPv6 specifications (as defined in the above document, for example) will be dropped since the CoTI (Care-of Test Init) message will be sent from the new CoA, and will therefore not match the packets filters installed in the GGSN. The present application, however, does not address the problem of the RR test in 3GPP but assumes that the Mobile IP node can authenticate binding update message using other methods (e.g. signing the Mobile IP binding update thanks to asymmetric technologies). The present application focuses on the problem described in the above paragraphs.

In addition, the problem extends to the more general scenario where the UE sets up a communication with a correspondent node (CN) that is a Mobile IP node. With respect to the scenario shown in FIG. 1, in this case the node A would set up a communication with the node B.

When the UE activates the PDP context and provides TFTs (Traffic Flow Templates) for QoS, the source IP address of packets destined to the UE can be used as filtering information to allow the GGSN to apply the appropriate treatment to the packets (e.g. QoS). However, if the CN changes its address (e.g. from HoA to CoA or from old CoA to new CoA), the GGSN would not be able to filter the packets appropriately.

The issues described above were due to the fact that the CN is mobile, but some other issues also exist when the UE is mobile. These issues are described below.

3GPP is already considering introducing Mobile IP for support of mobility from GPRS to alternative accesses (e.g. WLAN). However, the current mechanisms of 3GPP, and more particularly the Authorization Request/Authorization Decision procedure, defined in TS 29.207, would not support Mobile IP. In order to support Mobile IPv6 in current 3GPP networks (at least as a basic solution) the mobile UE (i.e., the mobile node which changes its address) needs to have a Home Address (HoA) registered with a Home Agent, and obtains the Care-of Address (CoA) from the GGSN upon PDP context activation. Mobile IPv6 signalling and mechanisms are therefore transparent to PDP context management.

In order for the mobile UE to allow mobility management using Mobile IP and to avoid SIP mobility, the mobile UE needs to provide the Home Address (HoA) as the address provided in the SDP body (as described in TS 24.228 when the user establishes the media stream with SIP). The use of the care-of address would in fact require SIP mobility since if the UE changes the CoA, the UE needs to re-register with the SIP server or modify the on-going communication appropriately in order to maintain reachability. However, the use of the HoA in the SIP messages does not allow the QoS authorization through the Go interface to work correctly.

This is described in the following by referring to a signal flow diagram shown in FIG. 2, illustrating an example of GPRS and COPS interactions during a (mobile originating) session setup when SBLP (Service-based Local Policy) is applied. This flow diagram is described in detail in 3GPP TS 24.228 V5.5.0, for example. In the following, a short summary of the messages is given.

In process 1, the UE initiates a session by sending a SIP INVITE request to the P-CSCF. The P-CSCF replies with a 100 Trying message in order to inform the UE that the session initiation is carried out. The P-CSCF forwards the SIP INVITE request in process 3 to the CN (i.e., the corresponding network elements for the CN). IN response to the INVITE request, first a 100 Trying message is sent to the P-CSCF, after this, a 183 Session Progress response is sent in process 5.

In process 6 (Authorise QoS Resources), the P-CSCF obtains a Meida Authorisation Token from the PDF at the reception of the 183 Session Progress response at the P-CSCF. The 183 Session Progress response sent in process 7 from the P-CSCF to the UE typically contains the P-Media Authorization header, which holds the Media Authorisation Token. Upon receipt of the Media Authorisation Token, the UE generates a flow identifier which identifies an IP media flow associated with the SIP session. The Flow Identifiers are based on the sequence of media flows in the SDP. A Flow Identifier combined with the Authorization Token is sufficient to uniquely identify an IP media flow.

In processes 8 to 11, the UE responds with a PRACK, in response to which a 200 OK (PRACK) message is sent from the CN to the UE.

In process 12 (GPRS: Active PDP Context), the UE sends an Activate PDP Context message to the SGSN as defined in 3GPP TS 24.008. The UE associates the PDP context to the session by including the media authorisation token information and the flow identifier(s) information. The PDP context is bi-directional.

In process 13 (GPRS: Create PDP Context) sent from the SGSN to the GGSN, the SGSN checks the user profile to authorise the requested QoS and also the available resource, if both are granted, it sends the corresponding Create PDP Context message to the GGSN as defined in 3GPP TS 29.060. This message contains the media authorisation token information and the flow identifier(s) information.

When the Create PDP Context message is received in the GGSN containing the media authorisation token information and the flow identifier(s) information, the Policy Enforcement Point in the GGSN sends a COPS REQ message in process 14 to the PDF as described in 3GPP TS 29.207. The PDF verifies that the media authorisation token information and the associated flow identifier(s) information are as expected.

After this, the PDF sends a COPS DEC message back to the GGSN in process 15,. The GGSN sends a COPS RPT message back to the PDF in process 16, and includes an acknowledgement and/or an error response to the DEC message.

Thereafter, the GGSN checks its own available resources and if enough resources are available, it sends a Create PDP Context Response message in process 17 back to SGSN containing the negotiated value of the UMTS QoS IE as defined in 3GPP TS 29.060. In process 18 (GPRS: Active PDP Context Accept), the SGSN sends an Activate PDP Context Accept message to UE containing the negotiated value of the UMTS QoS Information Element as defined in TS 24.008.

As the confirmation of the preconditions are requested in the 183 (Session Progress) response, when the UE finishes the QoS reservation for both the uplink and downlink direction, according to the GPRS procedures as indicated by the GPRS: Active PDP Context Accept message, it sends an UPDATE or COMET request in processes 19 and 20 to the terminating endpoint (i.e., the CN), via the signalling path established by the INVITE request. The UPDATE request includes in the SDP the information about the successful QoS bi-directional mode, due to the successful bi-directional PDP context established. The SDP indicates that the QoS resource reservation for both send and receive mode was successful from the terminating endpoint side.

This process is followed by a 200 OK (COMET) responses in processes 21 and 22, and by 180 Rining messages in process 23 and 24. In processes 25 to 28 the UE sends again a PRACk message to the CN, which is replied to by a 200 OK (PRACK) message 9.

When the P-CSCF receives the 200 (OK) response to the INVITE request in process 29, the PDF sends a COPS DEC message to the GGSN in process 30 to enable the use of the authorised QoS resources, i.e. to open the 'gate', and allow packet flow in both directions in accordance with the policy decision within the GGSN Policy Enforcement Point.

The GGSN receives the COPS DEC message (process 30) and enables the use of the authorised QoS resources, i.e. opens the 'gate' within the GGSN, and sends a COPS RPT message back to the PDF in process 31.

In process 32, the 2000K (INVITE) message is forwarded to the UE, which finally responds with an ACK message in process 33 and 34.

In the following, the messages important for understanding the present application are summarized.

In message 12 , the UE sends the Activate PDP (Policy Decision Function) context activation message including the Binding information. This binding information will be used by the PDF to determine the authorised QoS, packet filters, and gate status to be applied (message 14). As described in 3GPP TS 29.207, the PDF (located in the P-CSCF) more particularly verifies that the binding information provided by the GGSN is associated with an ongoing SIP session at application layer.

If such is the case, the PDF then responds with a Authorization_Decision message (message 15) containing Packet filters. And as specified in 3GPP TS 29.207 "the GGSN shall enforce the policy decision". "To enforce the policy decision, the GGSN shall install the packet filters received from the PDF, and ignore the UE supplied TFT." As mentioned above, the packet classifier parameters are: the Source IP address, the Destination IP address, the Source ports, the Destination ports, and the Protocol ID.

Two issues can be identified:

First, as stated in the 3GPP TS 29.207, "in the uplink direction, IP packets which do not match any packet filter shall be silently discarded". Since the SIP session was established based on the UE's HoA, the Source IP address of the uplink packet filter received from the PDF will point to the UE's HoA. However, packets sent by the UE have their source address set to the PDP address which is also the Care of Address. The uplink packets will therefore be dropped by the packet filters.

Another issue is also related to the downlink packets: since the SIP session is established between the UE (which is in this case the mobile node MN) and the CN (correspondent node, i.e., the network node with which the UE establishes a SIP session), the source IP address of the packet filters will be set to the CN's IP address whereas, the packets may be coming from the UE's Home agent (i.e. due to tunnelling by the Home Agent as in Mobile IP procedures). The fields not matching, the downlink packets will be dropped.

In conclusion, Mobile IP would not be supported by GPRS.

This is also a problem with respect to security and mobility. Namely, current firewalls do not support the Mobile IP protocol, but many issues exist preventing Mobile IP communications between a node protected by a firewall and an external node.

In detail, in order to protect the UEs from different types of Denial of Service (DoS) attacks, mobile operators will deploy firewalls in the networks. The following paragraph provides some background information on stateful firewall:

When a trusted internal host connects to a TCP socket on another host, a so-called stateful packet inspection filter protecting the network creates a state: upon receiving the SYN packet, the firewall makes an entry in its state table containing the destination socket and the response socket, and then forwards the packet to the destination. When the response comes back, the filter can simply look up the packet's source and destination sockets in its state table, see that they match an expected response and pass the packet. If no table entry exists, the packet is dropped because it was not requested from inside the network. The filter removes state table entries when the TCP close session negotiation packets are routed through, or after some time of inactivity based on a timer (usually a few minutes). This ensures that dropped connections don't leave table "holes" open.

Stateful packet inspection filters similarly create a state for UDP datagrams and after time of inactivity based on a timer (usually a few minutes), the states are removed.

Considering Mobile IP, an inner Mobile Node (MN) (i.e., a MN protected by a firewall) may send a first packet to its Home Agent (HA) (located outside the firewall) such as a Binding update (BU) message. According to current technology, this will create an entry in the stateful firewall allowing packets sent from the HA to the MN to pass the firewall. Such state will however only be based on timer, and it will typically expire after some time of inactivity. After being idle for some time, a packet may however be sent to the MN and the firewall not having the state for this node will discard the packet.

Other issues also exist when e.g. an external node (i.e., located outside the firewall) is a Mobile IP node and changes its CoA:

In scenarios where the external node is an IP mobile node and it either decides to use route optimization, or was already doing so and changes its CoA (similar as described above), all the packets sent from the external mobile node with the new CoA do not match the state in the filter and are therefore dropped. This happens because either the state in the firewall was based on the external node's HoA or on the old external node's CoA.

Hence, similar problems as described above with respect to packet filtering also occur upon using firewalls.

SUMMARY OF THE INVENTION

Hence, it is an object of the invention to remove the above drawback such that Mobile IP can be supported in environments in which packet filtering is carried out based on source and/or destination IP addresses.

This object is solved by a method for controlling a connection between a first network node and a second network node, the method including the steps of controlling a connection by a packet filtering function, filtering packets such that a packet is discarded in case at least one of a source address and a destination address do not comply with a filtering rule, and changing an address of at least one of the first network node and a second network node, informing the packet filtering function about a new address of the network node having changed its address, and updating a packet filter of the packet filtering function by using the new address of the network node having changed its address.

Alternatively, the object is solved by a network system including a first network node, a second network node and a packet filtering function for controlling a connection between the first and the second network node, wherein the packet filtering function is configured to control the connection by filtering packets such that a packet is discarded in case at least one of a source address and a destination address do not comply with a filtering rule, wherein at least one of the first or second network node is configured to change its address, wherein the packet filtering function is informed about the change of address of the network node having changed its address, and wherein the packet filtering function is configured to update the packet filter by using the new address of the network node having changed its address.

The invention also proposes a packet filtering device for controlling a connection between a first and a second network node, the device including a control means for controlling the connection by filtering packets using a packet filter such that a packet is discarded in case at least one of a source address and a destination address do not comply with a filtering rule, a receiving means for receiving information about a change of address of a network node having changed its address, and updating means for updating the packet filter by using a new address of the network node having changed its address.

Thus, according to the invention the packet filters are updated with the new address of a network node having changed its address. Hence, an ongoing session, e.g., a SIP session, can continue since the packet filters are adapted to the new address. Therefore, a support of mobile IP for, e.g., GPRS is provided.

Hence, an IP handover can be achieved which is practically unnoticeable to the users involved in an ongoing session.

It is noted that the invention is always applicable in case packet filters based on source and/or destination address of nodes participating in a session are used.

According to a further aspect of the invention, the second network node may be adapted to change its address and to inform the first network node about the new address, and the first network node may inform the packet filtering function about the new address of the second network node.

The network node changing its address may inform the new address during a binding update (BU). Furthermore, the new address may be a new Care-of Address (CoA).

According to a further aspect of the invention, a new packet filter may be created during updating the packet filter by copying the existing packet filter and replacing the changed address with the new address of the network node having changed its address.

According to a further aspect of the invention it may be checked, upon receiving the new address of the network node, whether this is the first time during the connection that the network node changes its address. Then, in case it is the first time, the old address may be regarded as a home address (e.g. HoA), and the new address may be regarded as a care-of address (CoA), the current packet filter may be maintained as a home address filter, and a new packet filter may be created based on the new address by copying the current packet filter and using the new address instead of the old address for the corresponding address in the packet filter. Thus, the new packet filter may be used the same for filtering.

In this way, it can easily be recognised whether the network node in question already has a care-of address or whether it is reachable only via the home address (i.e., via the Home Agent). Moreover, the filter comprising the home address is stored for possible later use.

In case it is not the first time that the network node changes its address, the new address may be regarded as a new care-of address (CoA), the old address may be replaced by the new address in the packet filter, and this new packet filter is used for filtering.

Furthermore, it may be determined that this is the first time during the connection that the network node changes its address by checking whether there is only one address for the network node present.

According to a further aspect of the invention, the packet filter may comprise an extension field. Then, upon updating the packet filter, the following is performed: It may be checked whether this is the first time during the connection that the network node changes its address, and if this is the first time, the old address may be regarded as the home address of the network node, the home address of the network node may be written in the extension field, and the corresponding address of the network node in the packet filter may be updated to the new address received.

In case this is not the first time, a value in the extension field as the home address of the network element, and the address of the network node in the packet filter may be updated to the new address.

It may be determined that this is the first time during the connection that the network node changes its address by checking whether there extension field is empty.

According to a further aspect of the invention, the packet filter may comprise an extension field indicating a home address of the network node having changed its address. Then, upon updating the packet filter, the home address indicated in the extension field may be compared with a home address delivered by the network node, and, if both addresses are the same, the corresponding address in the packet filter may be substituted by the current address of the network node.

In the downlink direction, the corresponding address in the packet filter may be a destination address in the packet filter. On the other hand, in the uplink direction, the corresponding address in the packet filter may be a source address in the packet filter.

The packet filtering function may be a firewall (FW) protecting one of the first or second network node.

A state of the packet filtering function (e.g., the firewall) may be created for the connection, and the state may comprise at least the parameters: Care Of IP Address and Home Address of the network node having changed its address, and destination IP address. In this way, a mobile IP aware firewall can be provided.

Furthermore, a pre-entry may be created in a table of the packet filtering function (e.g., firewall) upon receiving a binding update message from the network node being protected by the packet filtering function.

Hence, an incoming binding acknowledgement may be checked as to whether a corresponding pre-entry of a corresponding preceding binding update message is present, and, in case no corresponding pre-entry is present, the binding acknowledgement message just received may be ignored. In this way, Denial of Service (DoS) attacks may be prevented, for example.

The connection between the two network nodes and protected by the packet filtering function may be a SIP session.

DETAILED DESCRIPTION OF THE PREFERRED EMBODIMENTS

Figure 1:
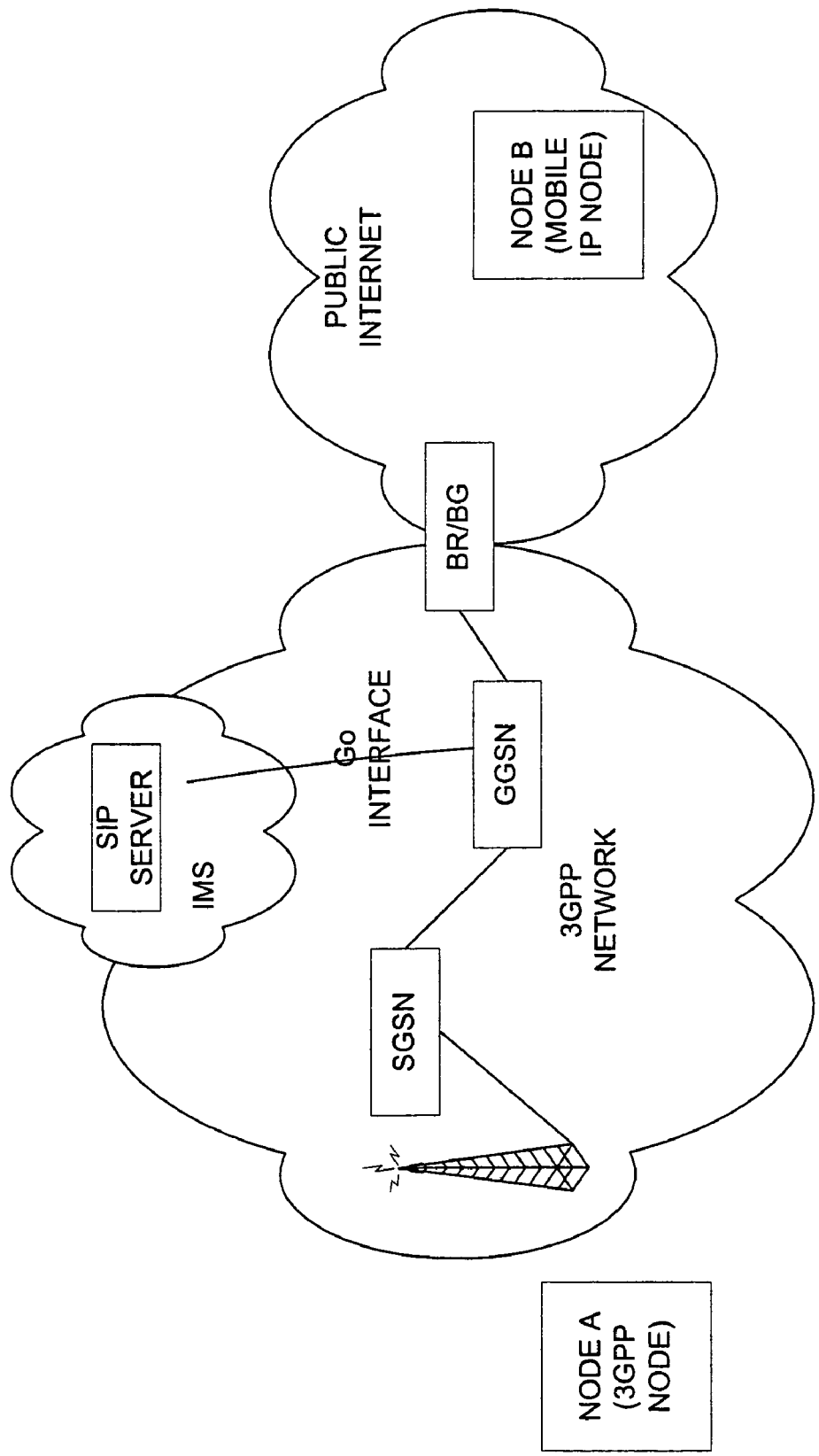
FIG. 1 shows a scenario in which a Mobile IP node is connected to a 3GPP network.

In the following, preferred embodiments of the present invention are described by referring to the attached drawings.

As described above, according to the invention, a method is provided by which the connection (e.g., a SIP session) between a first network node and a second network node is controlled by a packet filtering function which provides packet filters. The connection is controlled by filtering packets such that a packet is discarded in case a source address and/or a destination address does not comply with a filtering rule. At least one of the first or the second network node may change its address. For example, this network node may be a mobile node. When the network node changes its address, the packet filtering function is informed about the new address, and the packet filter is updated by using the new address of the network node having changed its address.

In a first case, the second network node may be able to change its address, and informs the first network node about the new address, which in turn informs the packet filtering function about the new address of the second network node.

In a second case, the first network node may be able to change its address and informs the packet filtering directly about the new address.

The way how the packet filters are updated is described in the following by way of some illustrative embodiments.

In the embodiments, the following definitions are used:

A Mobile Node (MN) is a node that can change its point of attachment from one link to another, while still being reachable via its home address.

A Correspondent Node (CN) is a peer node with which a mobile node is communicating. The correspondent node may be either mobile or stationary.

As described above, two network nodes are involved in the procedure according to the embodiments. The communication between these two network nodes is established through the filtering node. Both of these network nodes can be a MN, and then the other network node is the CN. When the MN moves, i.e., the address changes, this causes some problems on the filtering node. The target of the embodiments is to solve this problem and to support the mobility.

In the following embodiments, different solutions are given for different situations.

According to a first embodiment, a method is defined to support communications between a UE (User Equipment, which is according to this embodiment a 3GPP node) and a Peer Node (PN), which is according to the first embodiment a Mobile IP node (According to the above definition, the PN is an MN (Mobile Node) according to the first embodiment). In particular, according to the first embodiment a mechanism between the UE and a packet filtering network element is defined to update the packet filters in the network elements.

Examples are the 3GPP scenario where the UE sets up a communication with the PN establishing a PDP context, and the packet filtering network element is a GGSN, or cdma2000 where the UE sets up a service instance with the PDSN (Packet Data Serving Node). This applies in particular to 3GPP IMS communications where a SIP call is established between the UE and the PN, and the packet filtering information is set in the GGSN by the PDF as part of the Go-interface procedure.

In general, according to the first embodiment, upon receiving a Binding update from the PN (i.e., the Mobile IP node), the UE will update the packet filters in the packet filtering network element (e.g. GGSN) with the new Care of address of the PN.

Figure 3A:
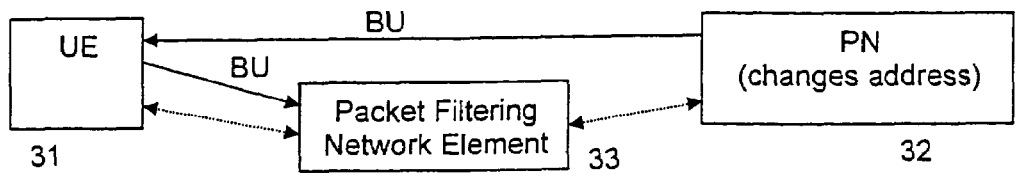
FIG. 3A illustrates the relationship between a UE (User Equipment), a PN (Peer Node) and a filtering node according to a first embodiment of the invention.

The general relationship between the UE, the PN and a packet filtering network element (a filtering node) is illustrated in FIG. 3A. The normal packet flow is illustrated by the dotted arrows (i.e., the packet flow between PN 33 and UE 32 controlled by the packet filtering network element 32), and a binding update (BU) sent by the PN to the UE and then forwarded from the UE to the packet filtering network element is illustrated by a solid arrow. The packet filtering network element is included in the GGSN according to the present embodiment. However, alternatively the packet filtering network element may be included in a PDSN, or may be a stand-alone network device (e.g., a firewall).

Figure 3B:
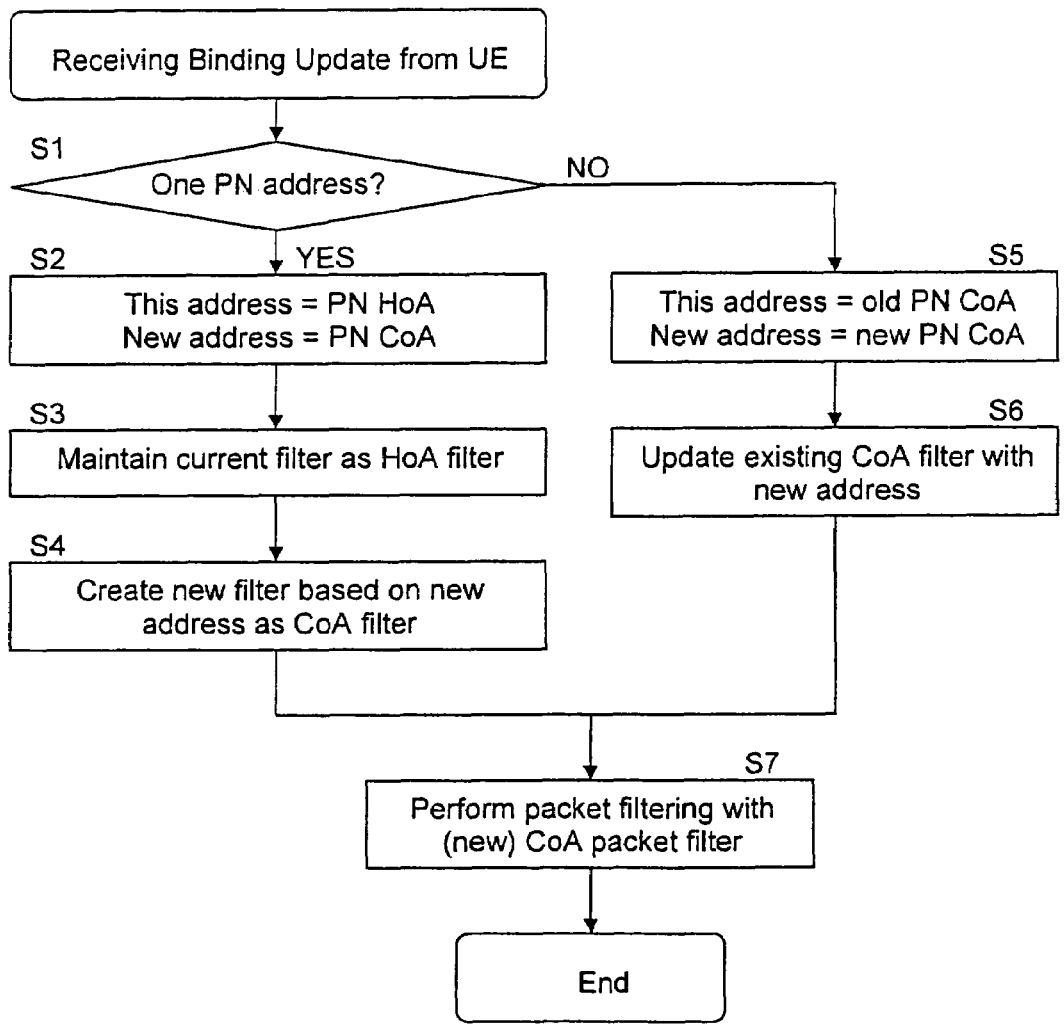
FIG. 3B shows a flow chart of a basic procedure according to the first embodiment of the invention.

In the following, a basic procedure according to the first embodiment is described by referring to the flow chart shown in FIG. 3B.

It is noted that this procedure is always carried out in case the packet filtering network element receives a Binding Update (BU) from the UE, which, in turn, has received the Binding Update from the PN. Furthermore, upon receiving a Binding Update, the UE first verifies the validity/authenticity of the received Binding Update message. Moreover, the Binding Update concerns here change of the address of the PN (mobile IP node).

In step S1 it is checked whether there is only one address for the PN.

That is, if the packet filtering network element has only one address for the PN in the packet filters (both for the Go case for IMS (IP Multimedia Subsystem) calls and the TFT (Traffic Flow Templates) case for non-Go scenarios) (i.e., "Yes" in step S1), this is assumed to be the PN HoA (i.e., the Home Address of the Peer Node) (step S2). Therefore, the new address provided by the PN (via the UE) is considered the PN CoA (i.e., the Care-of Address of the Peer Node) (step S2). The packet filtering network element maintains the current filtering information (here indicated as HoA filters) (step S3) and creates new filters (CoA filters) by copying the existing ones and replacing the source IP address of the downlink packets with the PN CoA (i.e. the new address provided by the UE) (step S4). This enables the packet filtering network element to appropriately filter the packets from the PN to the UE (step S7), and allows the PN to send packets both through route optimisation (i.e. directly from the CoA to the UE), or through its home agent (i.e. source address is HoA). It also creates new CoA uplink filters (e.g. in the case of IMS calls and Go interface) by copying the existing uplink packet filters and setting the new CoA to the destination address.

On the other hand, if the packet filtering network element already has information on both the HoA of the PN and a CoA for the PN and therefore has both HoA filters and CoA filters ("No" in step S1), it is assumed that the new address is a new, i.e., updated, PN CoA (step S5). Hence, the packet filtering network element updates the source IP address of the downlink packet in the CoA filters to the new CoA (step S6). It also changes the destination IP address of the uplink packet filters (if any, e.g. in the case of IMS calls and Go interface) to the new CoA. (Some flags could be used to differentiate the HoA and CoA filter rules, as will be described later).

Thereafter, the packet filtering is based on the new packet filter including the new PN CoA (step S7).

Thus, according to the first embodiment, the packet filters are updated such that new packet filters are created by copying the existing packet filters and amending the respective addresses (i.e., those which have changed).

In the following, a second embodiment of the present invention is described, according to which the procedure of the first embodiment can be enhanced, as will be described in the following.

That is, according to the second embodiment basically the same situation as illustrated in FIG. 3A is present. Namely, the PN is a mobile IPv6 node and changes its address, and the UE is a 3GPP node.

According to the second embodiment, extension fields are added to the packet filters and also to the packets. As will be described in the following, the extension fields may comprise a Home Address Option field or a Routing Header type 2 field. The source and/or destination address of packet filters are updated based upon information carried in the extension fields. Upon filtering, also the information in the extension fields is compared.

In the following, the downlink case is described.

In detail, upon receiving the update from the UE, the packet filtering network element extends the packet filters to also include a Home Address Option field (downlink packet filters) and the Routing Header type 2 field (uplink packet filters, if any) in addition to the source and destination IP addresses currently being used. When the connection between the UE and the packet filtering network element is setup (e.g. with UE providing TFTs or the PDF setting the filters through Go), the filters most probably have the Home Address Option and the Routing Header fields empty, and they are populated when the UE provides the new addresses. In this scenario no new filters are created, but the existing ones are modified. It is noted that in this enhanced procedure, a 3GPP node has to support Mobile IPv6 signalling.

This procedure is described in the following by referring to the flow charts shown in FIGS. 4A and 4B.

Figure 4A:
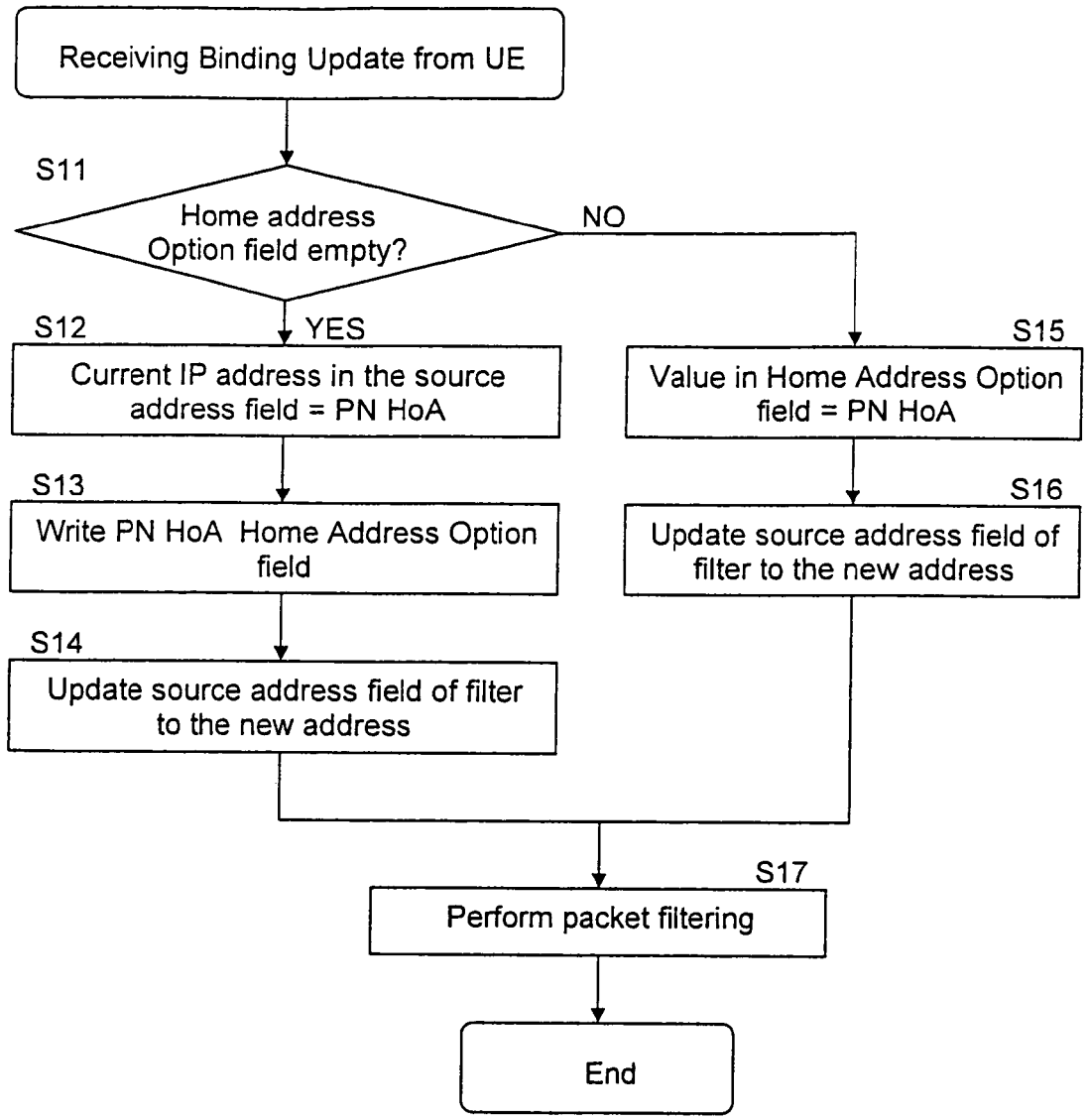
FIG. 4A shows a flow chart of a procedure according to a second embodiment of the invention for the downlink direction.

FIG. 4A illustrates the procedure in the downlink direction. In step S11, the packet filtering network element checks whether the Home Address Option field described above is empty. That is, it is checked whether this is the first time that the PN changes its address, since otherwise this field would not be empty, as will be shown below.

If the current downlink filters do not have a value set for the Home Address Option field, i.e., the Home Address Option field is empty, the current IP address in the source address field of the filters is considered the PN HoA (Step S12) and it is used to populate the Home Address Option field of the filters (step S13). This avoids that the UE modifies completely the original connection, since the UE cannot modify the value of the HoA but only provide a new CoA value. The source IP address of the downlink packet filters is updated to the new CoA (step S14).

If the current downlink filters have a value set for the Home Address Option field ("No" in step S1), the current IP address in the Home Address Option field of the filters is considered the PN HoA (step S15), and the source IP address of the downlink packet filters is updated to the new CoA (i.e. the new address provided by the UE) (step S16).

After this, packet filtering is carried out as described above, i.e., based on destination IP address, source IP address and the like.

Figure 4B:
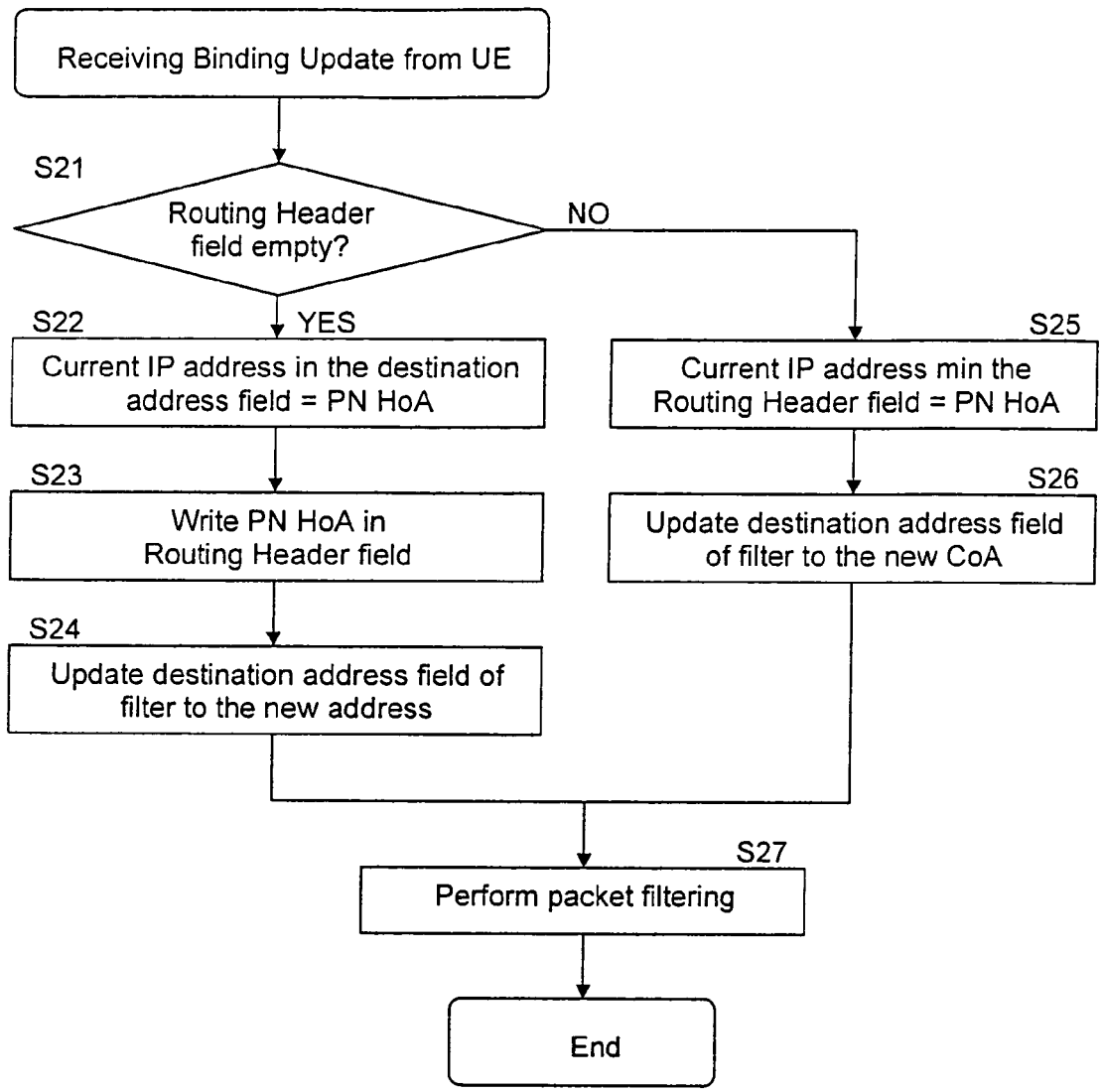
FIG. 4B shows a flow chart of an enhanced procedure according to a second embodiment of the invention for the uplink direction.

A similar procedure is carried out in the uplink direction, as shown in FIG. 4B.

That is, in step S21, upon receiving a Binding Update from the UE, it is checked whether the Routing Header field is empty.

If the current uplink filters (if any) do not have a value set for the Routing Header field ("No" in step S21), the current IP address in the destination address field of the filters is considered the PN HoA (step S22) and it is used to populate the Routing Header field (step S23). Similar to the downlink case, this avoids that the UE modifies completely the original connection, since the UE cannot modify the value of the HoA but only provide a new CoA value. The destination IP address of the uplink packet filters is updated to the new CoA (step S24).

If the current uplink filters (if any) have a value set for the Routing Header field ("No" in step S21), the current IP address in the Routing Header field of the filters is considered the PN HoA (step S25), and the destination IP address of the uplink packet filters is updated to the new CoA (i.e. the new address provided by the UE) (step S26).

After this, packet filtering based on destination IP address, source IP address and the like is performed (step S27).

In detail, the filtering is performed as follows:

Upon receiving incoming IP packets it is checked whether the IP packet comprises any Home address destination option or Routing header (type 2) extension. It is noted that a mobility header is defined by the Mobile IP protocol but only Binding update and binding acknowledgement (signalling) messages have a mobility header. In contrast thereto, user data IP packets do not have Mobility headers.

For this reason, it is checked whether incoming IP packets comprise Home address destination option or Routing header (type 2) extension.

If the packet does not have any Home address destination option nor Routing header extension, the packet filtering network element verifies that the source IP address of the packet matches the source IP address in the filter (besides matching other fields).

If the packet has a Home Address Destination Option, the packet filtering network element verifies that the source IP address of the packet matches the source IP address in the filter and that the address in the Home Address Destination Option matches the address in the Home Address Option field of the filter (besides matching other fields).

Next, the uplink case is described. Upon receiving packets originated by the UE, if any uplink packet filters exist, it is checked whether the packet comprises a routing header of type 2.

If the packet does not have any routing header of type 2, the packet filtering network element verifies that the destination IP address of the packet matches the destination IP address in the filter (besides matching other fields).

If the packet has a Routing Header type 2, the packet filtering network element verifies that the destination IP address of the packet matches the destination IP address in the filter and that the address in the Routing Header of the packet matches the address in the Routing Header field of the filter (besides matching other fields).

Hence, the packet filtering can be reliably carried out even when source and/or destination addresses are changed.

There are several ways to implement the first and the second embodiment. Some specific methods are described in the following, but the invention is not limited to the mentioned methods:

For 3GPP, the proposed protocol could be implemented as an extension to the current 3GPP PDP Context modification messages. By specifying some currently reserved flags, this protocol could be used between the 3GPP node and the GGSN to update the packet filters.

When the flag is set to 0, the PDP context modification message will be used as currently specified in the standards.

When the flag is set to 1, the PDP context modification message will carry the new IP address that should be used to update the packet filters. This can be achieved by having the UE provide new TFTs (Traffic Flow Templates).

As another implementation, the current Mobile IP binding update message could be used between the 3GPP node and the GGSN to update the packet filters.

In such case, the solution will only reuse the Mobile IP binding update messages to carry the necessary information but the processing of these messages is different than the Mobile IP protocol.

In addition, the UE needs to know the address where to send the binding update. It could be the GGSN IP address or alternatively the appropriate standardization forums (e.g. 3GPP, 3GPP2) could standardize an IP address for this use. The GGSN will intercept and process the binding update messages sent to this IP address as described in the above section.

The first and the second embodiments were described by referring to the example that the UE originates a session to the PN, which is a mobile node according to these embodiments. However, the embodiment is also applicable to the case that the PN originates a session to the UE. Moreover, also the UE may be a mobile node (MN) capable of changing its address. That is, the amendment of the packet filters can be carried out in both directions (assuming the case that both UE and PN change their CoA during the session). Furthermore, the PN may also be a fixed network node, and only the UE is a mobile node.

In the following, a third embodiment of the invention is described.

The principle situation according to the third embodiment is similar to that according to the first and second embodiment. That is, a connection between a UE and a PN is supported by a packet filtering function, but according to the third embodiment, the UE is able to change its IP address. In the following, a different way to modify the packet filters is described.

According to the third embodiment, an enhancement to the PDP context activation procedure and the GGSN behavior in 3GPP networks in order to support Mobile IPv6 mobility for SIP services is defined.

The procedures to be executed are described so that packet filters installed via the Go-interface allow support for Mobile IP based communications.

According to the third embodiment, it is assumed that the UE moves and changes its address from its HoA to CoA. Once UE's address changed, it initiates a BU with HA and then a BU with PN. Before the BU with PN, all packets are tunneled through HA (this is called reverse tunneling). That is, for example in the direction UE to PN, the packets are forwarded from the UE to the HA and then from the HA to the PN. After the BU with PN, packets can go to PN directly. Thus, in the following, the BU refers to the BU with PN.

As described also in the first embodiment, the packet filters will be based on the HoA and UE's IP address based on current existing procedure, while in order to support Mobile IP, the following rules should be in place. It is noted that the BU mentioned in the rules refers to the BU with PN mentioned above, and the downlink direction is from the PN (Peer Node) to the UE, whereas the uplink direction is from the UE to the PN.

| Source IP address | | Destination IP address | |
|---|---|---|---|
| Uplink | CoA | PN | (after BU) |
| Uplink | CoA | HA | (before BU, reverse tunnel header) |
| Downlink | PN | CoA | (after BU) |
| Downlink | HA | CoA | (before BU, the tunnel header) |

Currently, i.e., before change of address of the UE:

| PN | HoA | (downlink) |
|---|---|---|
| HoA | PN | (uplink) |

So, beside the PDP address (the CoA), the GGSN must be informed of the HoA (Home Address) of the mobile node (i.e., UE) as well as the Home Agent (HA) IP address. The GGSN must also maintain uplink and downlink rules for both after and before Binding Updates.

Figure 5A:
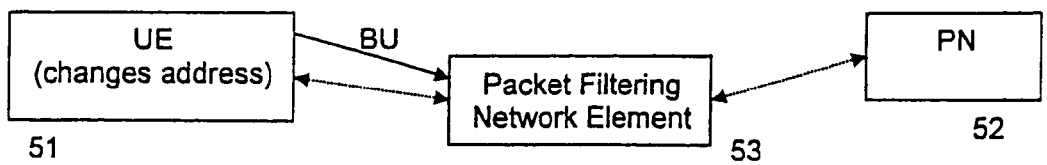
FIG. 5A illustrates the relationship between a UE (User Equipment), a PN (Peer Node) and a filtering node according to a third embodiment of the invention.

Similar to FIG. 3A for the first and second embodiment, FIG. 5A illustrates the relationship between a UE 51, a PN 52 and a packet filtering network element 53 according to the third embodiment. The normal packet flow via the packet filtering network element is denoted by dotted arrows, and the BU sent from the UE to the FW is denoted with a solid arrow. According to the present embodiment, the packet filtering network element is included in the GGSN. However, alternatively the packet filtering network element may be included in a PDSN, or may be a stand-alone network device (e.g., a firewall).

Thus, as also derivable from FIG. 5A, when the UE (i.e., the mobile node) changes its address, the PN is not involved in the filter updating procedure.

In the following, a first procedure to transmit this data to the GGSN is described in the present third embodiment.

One of the reserved values in the PDP Type Number field inside the requested PDP Address field (in Activate PDP Context request message) is assigned as type HoA, so that the Address Information provided in the requested PDP Address field is interpreted as the address to be used as HoA for the UE. This new PDP Type will let the GGSN assign a PDP address to the UE, although the Address Information field is not empty. The address assigned by the GGSN and returned to the UE is considered as the UE's CoA.

Figure 2:
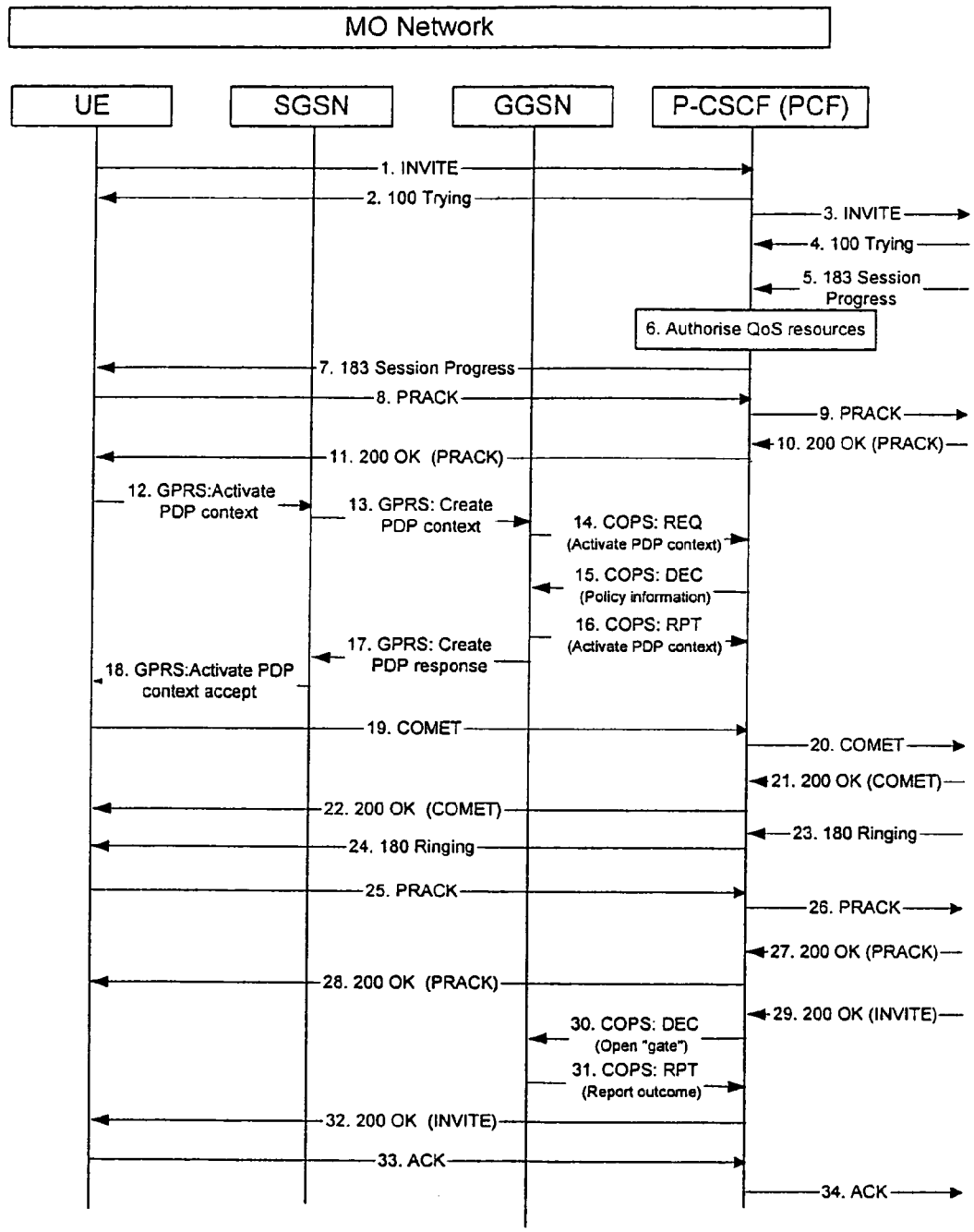
FIG. 2 shows a signal flow diagram of a SIP initiation procedure.

During the secondary PDP context activation, the so-called linked-TI (Transaction identifier) is used. The linked-TI is a session management information element, and the purpose thereof is to specify the active PDP context from which the PDP address for the new PDP context could be derived by the network. In the present case, during the secondary PDP context activation, (message 12 in FIG. 2), the linked-TI provided by the UE relates the secondary PDP context activation to the PDP address in the primary PDP context (i.e., in this case the CoA).

Figure 5B:
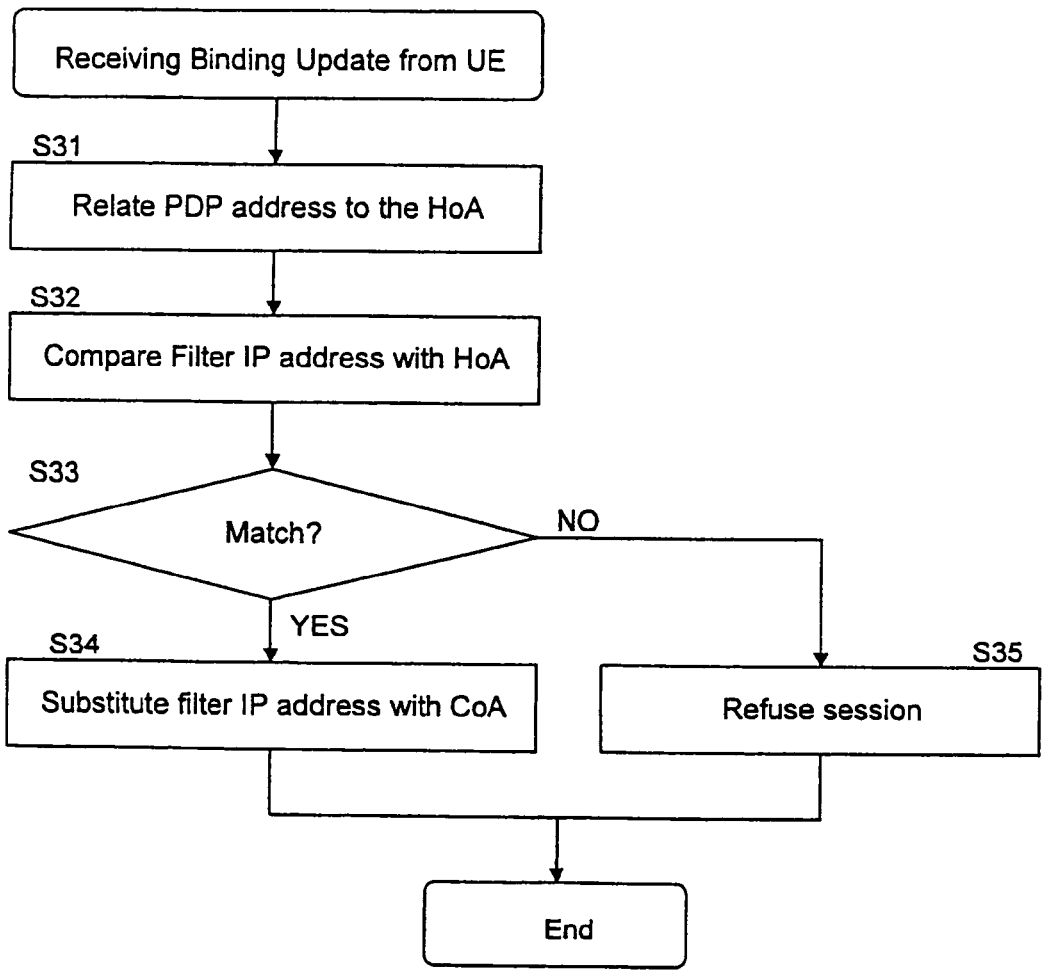
FIG. 5B shows a flow chart of a procedure according to the third embodiment of the invention.

This process during the secondary activation is described in the following by referring to the flow chart shown in FIG. 5B. Since the secondary PDP context is being activated in relation to a primary PDP context supporting Mobile IPv6, the GGSN relates the PDP address to the HoA (step S31) and in the Authorization Request/Authorization Decision procedure defined in TS 29.207, the GGSN compares the IP address in the Filter Specification from the Authorization_Decision message (Message 15 in FIG. 2) with the received HoA (steps S32, S33). Thus, no modification to Activate Secondary PDP Context Activation Request message (message 12) nor to the GGSN-PCF interface are therefore required. If these two addresses are the same ("Yes" in step S33), the GGSN substitutes the source IP address of the uplink packet filters and the destination IP address of the downlink packet filters with the PDP address (i.e., the CoA) (step S34).

In case the both addresses are not the same, an error procedure can be carried out, or the session could be simply refused (step S35).

In the following, an alternative procedure is described as a variation of the third embodiment of the present invention.

According to this variation, the GGSN is informed about the UE's HoA in a way which requires no modification to the Activate (primary) PDP Context Activation Request message. Only one additional new field needs to be defined in the secondary PDP context activation: thanks to this extension, the UE would send its HoA in the Activate Secondary PDP Context Request message (message 12 in FIG. 2). In the Authorization Request/Authorization Decision procedure defined in TS 29.207, the GGSN would compare the IP address in the Filter Specification from the Authorization_Decision message with the HoA received in the secondary PDP Context Activation Request message (same as in steps S32 and S33 of FIG. 5B).

Thus, no modification to the GGSN-PCF interface is required. If these two addresses are the same ("Yes" in step S33), the GGSN shall substitute the source IP address of the uplink packet filters and the destination IP address of the downlink packet filters with the PDP address (step S34).

Next, as a further variation of the third embodiment, a third procedure is described, in which the GGSN substitutes the source IP address of the uplink packet filters and the destination IP address of the downlink packet filters (both set to the UE HoA) with the PDP address (i.e. the CoA) upon receiving a positive Authorization_Decision message from the PDF. This solution has the advantage not to require any standardization effort but just minor modifications in the GGSN behaviour. However, it may present some limitations in the possibilities of the IP addresses used in SIP communications.

As for the Home Agent's IP address, this one should be forwarded by the UE to the GGSN e.g. using one of the PDP context messages. This requires extension to the current existing messages. Putting a wildcard in the source IP address of the downlink packets filters (i.e., an arbitrary IP address would fulfil the packet filtering rule) could solve the issue without requiring any modifications to the standards. However, using a wildcard would open the UE to more attacks.

Finally for a higher level of security, the GGSN could check both the outer and inner header of the IP packets, but this requires bigger changes in the packet filters and GGSN capabilities.

The invention is not restricted to 3GPP but is also applicable to 3GPP2, WLAN or any other network where the problem described above exists. In 3GPP2, the PDSN will act as the GGSN (for the identified required features) and perform the required operations described above.

The following advantages are achieved by the embodiment described above:
  No modification to SIP is required
  No modifications to Mobile IPv6 are necessary
  The implementation according to the first and second embodiment only requires the specification of some flags.
  The procedures according to the embodiments, even though affecting the packet filters, do not allow a node to attack other 3GPP nodes. From the security point of view, it does not open any holes for potential DoS (Denial of Service) towards the other nodes, since the packet filtering takes place not only on the source IP address of the CN but also on the HoA value in the Home Address destination option.
  Depending on the implementation adopted, as described in detail in the above embodiments, some implementations can allow the implementation of the solution without requiring minor modifications to the current existing 3GPP signalling protocols (PDP Context messages/Go Interface)

The procedures according to the embodiments described above are also applicable in case the Go interface is not present since the problem may also exist when Go is not implemented: the problem exists when there are packets filters in the network that may block IP packets.

In the following, a fourth embodiment is described which is directed to firewalls. As mentioned in the introductory part, current firewalls do not support the Mobile IP protocol, but many issues exist which prevents Mobile IP communications between a node protected by a firewall and an external node.

Thus, according to the fourth embodiment a Mobile IP aware firewall is defined so that nodes protected by a firewall could support Mobile IP communications while the firewall will still protect the node against the different types of Denial of Service attacks (DoS) and from rogue nodes.

The fourth embodiment is based on the following assumptions:

The inner nodes are trusted nodes. In the following, an inner node is referred to as UE (which is capable of changing its address and may be referred to as MN). Current firewall technologies rely on such assumption: when an inner node sends an HTTP request, current firewall e.g. let the packets pass the firewall and an entry is created in the FW (firewall) state table to let the response pass the Firewall and reach the UE. Rules can however prevent inner nodes from accessing specific services (e.g. finger, NFS, etc.).

The basic situation according to the fourth embodiment is the same as shown in FIG. 5A. That is, the packet filtering network element being a firewall (FW) according to this embodiment protects a connection between the UE and a PN, as illustrated by the dotted arrows, and the UE, which is the inner node described above, changes its address and sends a binding update BU to the FW. As according to the third embodiment, the PN can be regarded as a Correspondent Node (CN).

Figure 6:
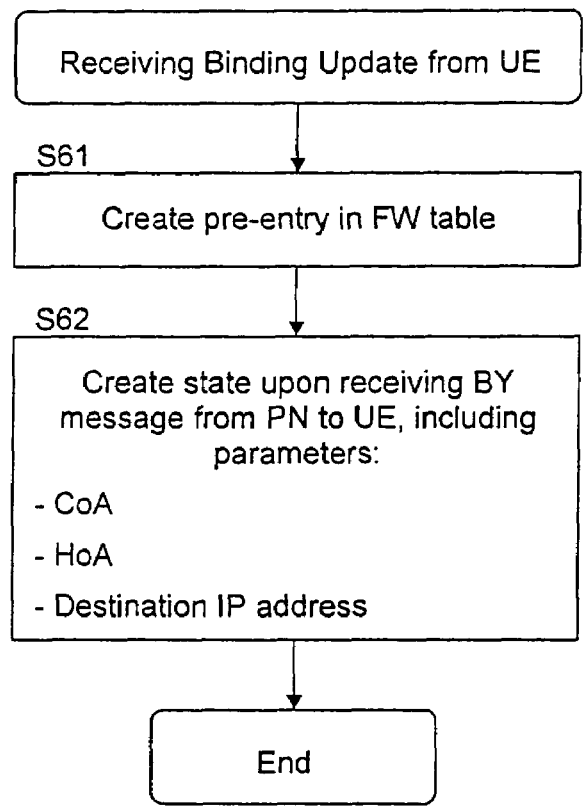
FIG. 6 shows a procedure for setting up a packet filter in a firewall according to a fourth embodiment of the invention.

Based on the assumptions above, the following procedures are defined according to the fourth embodiment. A first procedure for supporting mobility of the inner protected node according to the fourth embodiment is described by referring to the flowchart shown in FIG. 6.

Upon receiving a Binding update message (Mobility Header—Type value 5) from an inner node (i.e., UE), the firewall creates a pre-entry in its table (step S61).

The state is then created when the firewall receives the corresponding Binding acknowledgment (BA) message sent from the PN to the UE (step S62). The UE shall therefore have set the Acknowledge (A) bit in the Binding update messages to request a Binding Acknowledgment to be returned upon receipt of the Binding Update. The lifetime of this entry is derived from the lifetime of the Binding update message.

The created state includes at least the following parameters:
  The Care of IP address
  The Home Address
  The Destination IP address After this, incoming and outgoing packets will be filtered against at least these IP addresses.

When the inner node UE changes CoA, it sends a Binding Update message with the A bit set, and upon receiving the corresponding Binding Acknowledgement, the state is updated.

Upon receiving a deregistration message (Binding update—lifetime NULL) or expiration of the lifetime, the state should be deleted.

It is noted that the FW can differentiate a BU sent to HA from a BU sent to CNs (i.e., the PN) thanks to the so-called H flag. The H-Flag is defined for Firewalls and indicates that the route is to a specific host.

In addition, a Binding acknowledgement from an outer node without a pre-state in the firewall shall be ignored: this may otherwise create Denial of Service (DoS) attacks. A state must not be created/updated upon receiving a Binding acknowledgement only.

In the following, a second procedure is described as a variation of the first procedure according to the fourth embodiment. According to the second procedure, no pre-entry is created.

Upon receiving a Binding update message (Mobility Header—Type value 5) from an inner node UE, the firewall creates an entry in its table or updates an existing entry. The lifetime of this entry is derived from the lifetime of the Binding update message.

The created entry includes at least the following parameters:
- The Care of IP address
- The Home Address
- The Destination IP address Incoming and outgoing packets will be filtered against at least these IP addresses.

When the inner node UE changes CoA, it sends a Binding Update message, and the entry is updated so that the firewall is not left with "open" state.

Upon receiving a deregistration message (Binding update—lifetime NULL) or expiration of the lifetime, the state should be deleted.

It has to be noted that—similar as mentioned in connection with the first procedure—the FW can differentiate BU sent to HA from BU sent to CNs by means of the H flag.

For packets sent to the old CoA from the PN, after the UE has sent a Binding update message to change CoA, one of the following processes can be carried out:

Either the network policy could decide to drop the packets at the firewall since the state has been updated to the new CoA.

Alternatively, a timer will allow packets sent to the old CoA to pass the firewall for a temporary period of time configurable by the administrator. Thus, the packets to the old CoA can be redirected to the new CoA,. This can be effected by a mechanism to redirect packets sent to the old CoA to the new Mobile Node's CoA which is a part of the handover procedure. Typically, a tunnel is e.g. established between the previous access router and the new access router.

As another aspect of the fourth embodiment of the invention, in order to support change of CoA from the PN (i.e., the external correspondent node (CN)), the following procedure is carried out.

Upon receiving a Binding acknowledgement message (Mobility Header—Type value 6) from an inner node (UE), the firewall should create an entry in its table or update an existing entry. Upon receiving a binding Update message, the inner protected node shall therefore send a Binding acknowledgement message. That is, similar to the first and second embodiment, the inner node (UE) has to inform the packet filtering function, i.e. the firewall, about the new address of the PN.

The lifetime of this entry is derived from the lifetime of the Binding update message.

The created entry includes at least the following parameters:
- The PN's Care of IP address
- The PN's Home Address
- The Destination IP address After this, incoming and outgoing packets will be filtered against at least these IP addresses, as described above.

Upon receiving a deregistration message (Binding update/acknowledgement—lifetime NULL) or expiration of the lifetime, the state should be deleted.

In addition in order to support the Mobile IP protocol, the following behaviour is defined:

The firewall shall let Mobility Headers packets pass through the Firewall—This will allow the two communicating nodes to perform e.g. the Return routability test or the other procedures defined in the Mobile IPv6 specifications.

If the inner node is not supporting Mobile IP, it will send an ICMPv6 Parameter Problem Error message, and upon receiving such message, the firewall should drop all mobility headers sent to that user.

For security reasons, in order to prevent an inner node to misuse the signalling and behaviours described in the fourth embodiment, and e.g. try to open holes on behalf of other nodes for example to flood them, Ingress filtering should be applied. That is, when an inner node is sending a packet, the source IP address of such packet should be verified and the network should make sure that the specified IP address is the one that has been assigned to this user and not the IP address from another node.

Thus, the Mobile IP aware firewall according to the fourth embodiment allows nodes protected by a firewall to support Mobile IP communications while the nodes are still protected against the different types of Denial of Service attacks (DoS) and from rogue nodes.

No modifications to the Mobile IPv6 specifications are required according to the fourth embodiment.

Furthermore, the solution according to the fourth embodiment defines a solution to support Mobile IP in firewall that does not rely on new interfaces/protocols such as MIDCOM (Middlebox Communication), TIST (Topology-Insensitive Service Traversal), etc.

Figure 7:
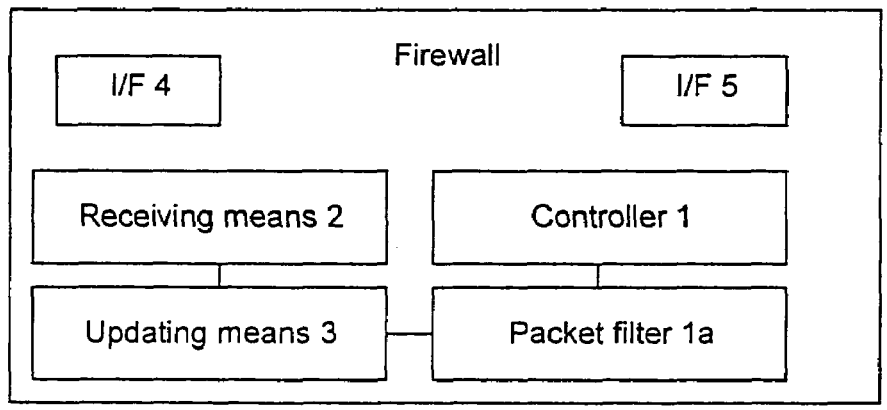
FIG. 7 shows a principle structure of a firewall according to the present invention.

FIG. 7 shows a packet filtering device (packet filtering function) implementing the functions of the embodiments described above. This device may be a firewall in this example.

The firewall functions to control a connection between the two network nodes (e.g., UE and PN). The firewall comprises a controller 1 for controlling the connection by filtering packets using a packet filter 1a. As mentioned above, filtering is performed such that a packet is discarded in case a source address and/or a destination address do not comply with a filtering rule. Furthermore, the firewall comprises a receiving means 2 for receiving information about the change of address of a network node having changed its address. Moreover, the firewall comprises an updating means 3 for updating the packet filter by using the new address of the network node having changed its address. Two interfaces (I/F) 4 and 5 provide connections to the network nodes.

It is noted that in the above device all means may be implemented as logical entities, and may be implemented as software.

It is noted that the invention is not limited to the embodiments described above, which should be considered as illustrative and not limiting. Thus, many variations of the embodiments are possible.

For example, the embodiments and the variations thereof may be arbitrarily combined.

The invention claimed is:

1. A method, comprising:
controlling a connection by a packet filtering function, filtering packets such that a packet is discarded in case one of a source address and a destination address do not comply with a filtering rule;
changing an address of at least one of a first network node and a second network node;
informing the packet filtering function about a new address of at least one of the first and second network node having changed its address;
updating a packet filter of the packet filtering function by using the new address of the at least one of the first and second network node having changed its address; and
checking, upon receiving the new address of the at least one of the first and second network node, whether this is a first time during the connection that the at least one of the first and second network node changes its address; and
if it is the first time, regarding an old address as a home address, and regarding the new address as a care-of address, maintaining a current packet filter as a home address filter, and creating a new packet filter based on the new address by copying the current packet filter and using the new address instead of the old address for a corresponding address in the new packet filter, and using the new packet filter to filter packets.

2. The method according to claim 1, wherein the changing comprises the second network node changing its address and informing the first network node about the new address, and the first network node informs the packet filtering function about the new address of the second network node.

3. The method according to claim 1, wherein the at least one of the first and second network node changing its address informs the new address during a binding update.

4. The method according to claim 1, wherein the new address comprising a new care-of address.

5. The method according to claim 1, wherein, in the updating, a new packet filter is created by copying an existing packet filter and replacing an old address with the new address of the at least one of the first and second network node having changed its address.

6. The method according to claim 1, wherein in a case where it is not the first time that the at least one of the first and second network node changes its address, performing:

regarding the new address as a new care-of address, replacing the old address by the new address in the packet filter, and using the packet filter to filter packets.

7. The method according to claim 1, further comprising:

determining that this is the first time during the connection that the at least one of the first and second network node changes its address by checking whether there is only one address for the at least one of the first and second network node present.

8. A method, comprising:

controlling a connection by a packet filtering function, filtering packets such that a packet is discarded in case one of a source address and a destination address do not comply with a filtering rule;

changing an address of at least one of a first network node and a second network node;

informing the packet filtering function about a new address of at least one of the first and second network node having changed its address; and updating a packet filter of the packet filtering function by using the new address of the at least one of the first and second network node having changed its address, wherein the packet filter comprises an extension field, and the updating comprises checking whether this is a first time during the connection that the at least one of the first and second network node changes its address, and if this is the first time, regarding an old address as a home address of the at least one of the first and second network node, writing the home address of the at least one of the first and second network node in the extension field, and updating a corresponding address of the at least one of the first and second network node in the packet filter to the new address received.

9. The method according to claim 8, wherein in a case where this is not the first time, regarding a value in the extension field as the home address of the network element, updating the address of the at least one of the first and second network node in the packet filter to the new address.

10. The method according to claim 8, further comprising:

determining that this is the first time during the connection that the at least one of the first and second network node changes its address by checking whether the extension field is empty.

11. The method according to claim 1, wherein in a downlink direction, the corresponding address in the packet filter comprising a destination address in the packet filter.

12. The method according to claim 1 wherein in an uplink direction, the corresponding address in the packet filter comprises a source address in the packet filter.

13. The method according to claim 1, wherein the packet filtering function comprises a firewall protecting one of the first or second network node.

14. The method according to claim 1, wherein a state of the packet filtering function is created for the connection, and the state comprises at least a care-of IP Address and a home address of the at least one of the first and second network node having changed its address, and a destination IP address.

15. The method according to claim 13, further comprising:

creating a pre-entry in a table of the packet filtering function upon receiving a binding update message from the at least one of the first and second network node being protected by the packet filtering function.

16. The method according to claim 15, further comprising:

checking an incoming binding acknowledgement as to whether a corresponding pre-entry of a corresponding preceding binding update message is present; and ignoring the binding acknowledgement message in case no corresponding pre-entry is present.

17. The method according to claim 1, wherein the connection comprises a session initiation protocol session.

18. An apparatus, comprising:

a controller configured to control a connection between a first and a second network node by filtering packets using a packet filter such that a packet is discarded in case one of a source address and a destination address do not comply with a filtering rule;

a receiver configured to receive information about a change of address of a network node having changed its address; and an updater configured to update the packet filter by using a new address of the at least one of the first and second network node having changed its address, wherein the updater is configured to check, upon receiving the new address of the at least one of the first and second network node, whether this is a first time during the connection that the at least one of the first and second network node changes its address, and in case it is the first time, to regard an old address as a home address, and to regard the new address as a care-of address, to maintain a current packet filter as a home address filter, and to create a new packet filter based on the new address by copying the current packet filter and using the new address instead of the old address for a corresponding address in the new packet filter, and to use the new packet filter to filter packets.

19. The apparatus according to claim 18, wherein the new address comprises new care-of address.

20. The apparatus according to claim 18, wherein the updater is configured to create a new packet filter by copying an existing packet filter and replace an old address with the new address of the at least one of the first and second network node having changed its address.

21. The apparatus according to claim 18, wherein in a downlink direction, the corresponding address in the packet filter is a destination address in the packet filter.

22. The apparatus according to claim 18, wherein in an uplink direction, the corresponding address in the packet filter is a source address in the packet filter.

23. The apparatus according to claim 18, wherein the packet filtering device comprising a firewall protecting one of the first or second network node.

24. The apparatus according to claim 18, wherein the controller is configured to create a state for the connection, and the state comprises at least a care-of IP Address and home address of the at least one of the first and second network node having changed its address, and a destination IP address.

25. The apparatus according to claim 23, wherein the controller is configured to create a pre-entry in a table upon receiving a binding update message from the at least one of the first and second network node being protected by the packet filtering function.

26. The apparatus according to claim 25, wherein the controller is configured to check an incoming binding acknowledgement as to whether a corresponding pre-entry of a corresponding preceding binding update message is present, and to ignore the binding acknowledgement in case no corresponding pre-entry is present.

27. The apparatus according to claim 18, wherein in case it is not the first time that the at least one of the first and second network node changes its address, the updater is configured
to regard the new address as a new care-of address,
to replace the old address by the new address in the packet filter, and
to use the packet filter to filter packets.

28. The apparatus to claim 18, wherein the updater is configured to determine that this is the first time during the connection that the at least one of the first and second network node changes its address by checking whether there is only one address for the at least one of the first and second network node present.

29. An apparatus, comprising:
a controller configured to control a connection between a first and a second network node by filtering packets using a packet filter such that a packet is discarded in case one of a source address and a destination address do not comply with a filtering rule;
a receiver configured to receive information about a change of address of a network node having changed its address; and
an updater configured to update the packet filter by using a new address of the at least one of the first and second network node having changed its address,
wherein the packet filter comprises an extension field, and the packet filtering function is configured
to check whether this is first time during the connection that the at least one of the first and second network node changes its address, and if this is the first time,
to regard the old address as a home address of the at least one of the first and second network node,
to write the home address of the at least one of the first and second network node in the extension field, and
to update a corresponding address of the at least one of the first and second network node in the packet filter to the new address received.

30. The apparatus according to claim 29, wherein the updater is configured, in case this is not the first time,
to regard a value in the extension field as the home address of the at least one of the first and second network node, and
to update the address of the at least one of the first and second network node in the packet filter to the new address.

31. The apparatus according to claim 29, wherein the updater is configured to determine that this is the first time during the connection that the at least one of the first and second network node changes its address by checking whether the extension field is empty.

* * * * *

UNITED STATES PATENT AND TRADEMARK OFFICE
CERTIFICATE OF CORRECTION

PATENT NO.         : 7,668,145 B2                          Page 1 of 1
APPLICATION NO.    : 10/859556
DATED              : February 23, 2010
INVENTOR(S)        : Le et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1638 days.

Signed and Sealed this

Twenty-eighth Day of December, 2010

David J. Kappos
*Director of the United States Patent and Trademark Office*